United States Patent
Falkenstein

(10) Patent No.: US 8,374,771 B2
(45) Date of Patent: Feb. 12, 2013

(54) METHOD FOR OPERATING A HYBRID VEHICLE DRIVE AND A DEVICE FOR CARRYING OUT SAID METHOD

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 1218 days.

(21) Appl. No.: 11/918,909

(22) PCT Filed: Feb. 21, 2006

(86) PCT No.: PCT/EP2006/060132
§ 371 (c)(1),
(2), (4) Date: Aug. 13, 2008

(87) PCT Pub. No.: WO2006/111434
PCT Pub. Date: Oct. 26, 2006

(65) Prior Publication Data
US 2008/0305921 A1 Dec. 11, 2008

(30) Foreign Application Priority Data
Apr. 21, 2005 (DE) .......................... 10 2005 018 437

(51) Int. Cl.
*B60W 10/00* (2006.01)
(52) U.S. Cl. ............ 701/105; 701/22; 701/99; 701/101; 701/103; 180/65.265; 180/65.275; 180/65.28
(58) Field of Classification Search ................. 701/22, 701/99, 101, 103, 105; 180/65.21, 65.25, 180/65.265, 65.275, 65.28, 65.285, 65.29
See application file for complete search history.

(56) References Cited

U.S. PATENT DOCUMENTS

| 5,806,617 | A  | * | 9/1998  | Yamaguchi ............... 180/65.235 |
| 5,832,396 | A  |   | 11/1998 | Moroto et al. |
| 6,336,063 | B1 |   | 1/2002  | Lennevi |
| 6,449,537 | B1 | * | 9/2002  | Phillips et al. ................... 701/22 |
| 6,470,983 | B1 | * | 10/2002 | Amano et al. ........... 180/65.235 |
| 6,545,372 | B2 | * | 4/2003  | Hanyu et al. ..................... 290/41 |
| 6,553,301 | B1 | * | 4/2003  | Chhaya et al. .................. 701/54 |
| 6,621,244 | B1 | * | 9/2003  | Kiyomiya et al. ............. 318/611 |
| 6,662,096 | B2 | * | 12/2003 | Komiyama et al. ............. 701/54 |
| 6,915,198 | B2 | * | 7/2005  | Phillips et al. .................. 701/54 |
| 7,223,201 | B2 | * | 5/2007  | Colvin et al. ..................... 477/5 |
| 7,295,902 | B2 | * | 11/2007 | Chen et al. ....................... 701/22 |
| 7,301,304 | B2 | * | 11/2007 | Weisgerber et al. .......... 320/132 |

(Continued)

FOREIGN PATENT DOCUMENTS

DE    44 22 636    1/1996
DE    44 22 647    1/1996

(Continued)

*Primary Examiner* — Thomas Black
*Assistant Examiner* — Peter D Nolan
(74) *Attorney, Agent, or Firm* — Merchant & Gould P.C.

(57) ABSTRACT

The invention relates to a method for operating a motor vehicle drive comprising at least one internal combusting engine (10), at least one electric machine (20) mechanically coupled to said internal combustion engine (10) and at least one power storage battery actively connectable to said electric machine (20) and to the internal combustion engine (1) in an on-board electric network, wherein said internal combustion engine (10) and electric machine (20) produces a nominal required drive torque (M) in a substantially common manner, the instant electromotive torque reserve ($M_{Eres}$) of the electric machines(s) (20) is determined and the internal combustion engine torque reserve is taken into account as a minimum reference torque reserve of the internal combustion engine for at least one or several internal combustion engines (10).

15 Claims, 2 Drawing Sheets

U.S. PATENT DOCUMENTS

Figure 1:
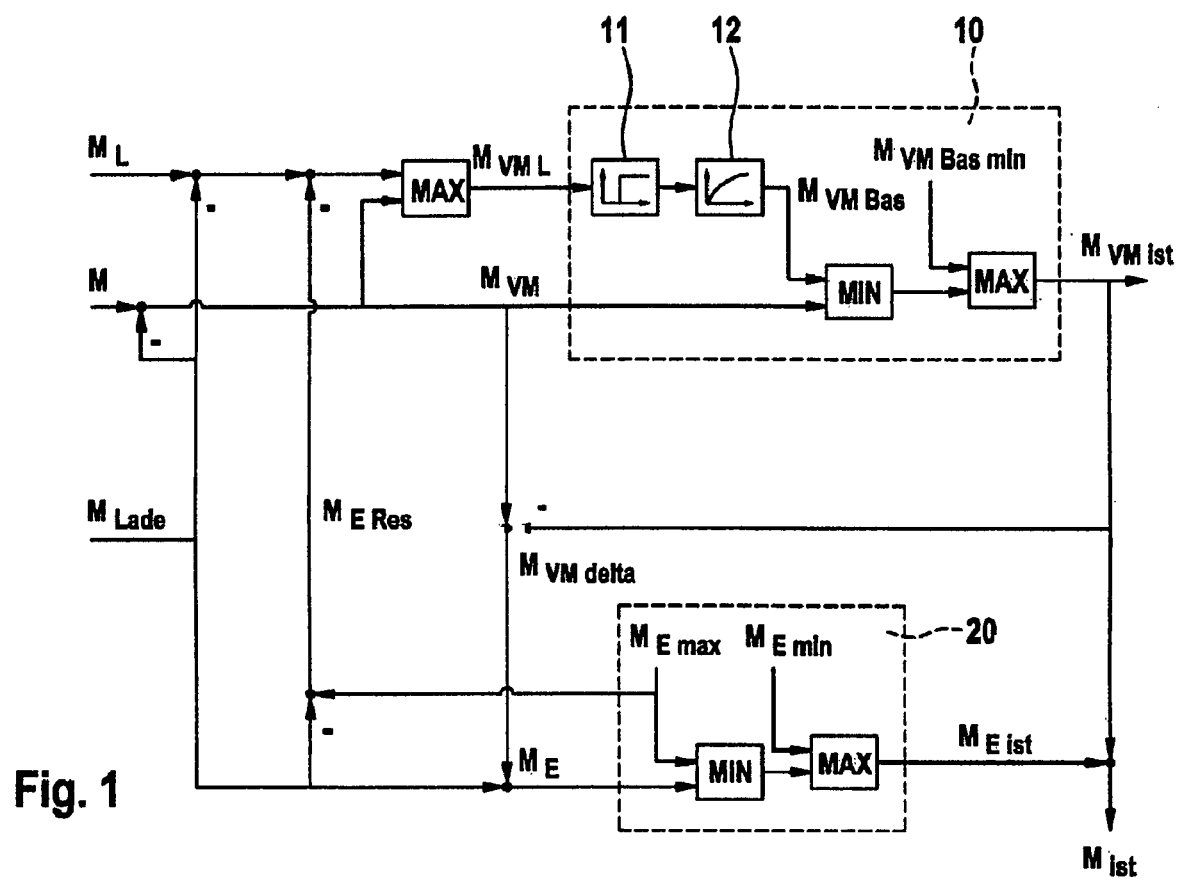

| | | | |
|---|---|---|---|
| 2003/0034187 A1* | 2/2003 | Hisada et al. | 180/65.1 |
| 2005/0246076 A1* | 11/2005 | Chen et al. | 701/22 |
| 2006/0169506 A1* | 8/2006 | Handa et al. | 180/65.5 |

FOREIGN PATENT DOCUMENTS

| | | |
|---|---|---|
| DE | 199 06 601 | 9/1999 |
| DE | 10 2004 044 507 | 3/2006 |
| EP | 1 106 412 | 6/2001 |
| EP | 1 300 273 | 4/2003 |
| EP | 1 350 650 | 10/2003 |
| JP | 6233411 | 8/1994 |
| JP | 775394 | 3/1995 |
| JP | 888905 | 4/1996 |
| JP | 2002256918 | 9/2002 |
| JP | 2006275019 | 10/2006 |
| WO | WO 96/01193 | 1/1996 |

\* cited by examiner

METHOD FOR OPERATING A HYBRID VEHICLE DRIVE AND A DEVICE FOR CARRYING OUT SAID METHOD

TECHNICAL FIELD

The invention concerns a method to operate a motor vehicle drive and a device to implement the method.

BACKGROUND

Hybrid vehicles are known for the reduction of emissions and fuel consumption. Their goal is to operate the internal combustion engine in the range of greatest efficiency, to turn off the internal combustion engine when the vehicle is idling, respectively traveling at low vehicular speeds, and electrically power it in these instances as well as using braking energy by means of recuperation. In the case of parallel hybrid engines, an addition of the torques from the internal combustion engine and one or more electric machines takes place. The electric machines are, for example, belt-driven starter generators or starter generators connected to the crankshaft of the internal combustion engine.

In modern internal combustion engines various operating points can be problematic with regard to exhaust gas emissions and fuel consumption. In the case of the gasoline engine, large torques, for example, require a deviation from the stoichiometric air-fuel mixture. A full load enrichment can likewise be necessary in order to keep component temperatures within acceptable limits. In order to set very small torques, a retardation of the ignition angle is common, which can also be deployed to achieve a lead torque, for example in order to make a rapid torque increase at idle possible. The degree of efficiency is, however, decreased by the shift in the ignition angle. In connection with overrun fuel cut-offs, increased nitrogen oxide emissions result on account of an oxygen surplus in the catalytic converter. Likewise when large torques are produced during the operation of a diesel engine, increased Bosch smoke degrees and nitrogen oxide emissions are too be anticipated. In the case of small torques, the danger exists that the catalytic converter cools down.

The German patent DE 10 2004 044 507, which was not pre-published, describes a method and a device to operate a motor vehicle drive with at least one internal combustion engine and with at least one electric machine, whereby the internal combustion engine and the electric machine produce a nominal required drive torque in a common manner. By means of a suitable deployment of the electric machine, unfavorable torque ranges and unfavorable, high alteration speeds of the optimal nominal torque of the internal combustion engine can be avoided.

SUMMARY

A method to operate a motor vehicle drive is proposed, in which at least the one internal combustion engine and at least the one electric machine produce a nominal required drive torque in a substantially common manner; and in which an instant electromotive torque reserve of the one or several electric machine(s) is ascertained and is taken into account during the specification of an internal combustion engine torque reserve so that said torque reserve is equal to a minimum reference torque reserve of the internal combustion engine for at least the one or several internal combustion engine(s). In sum total, a specified torque reserve for the drive torque of the entire drive is then present. It is advantageous for the internal combustion engine torque reserve created by means of an ignition angle retardation, which is accompanied by increased fuel consumption and exhaust gas emissions, to only then have to be deployed if the electromotive torque reserve of the electric machines has become too small to achieve the required torque reserve for the entire drive torque. An alteration, especially a reduction, of the torque of the internal combustion engine, which is practically free of delays, can result by means of the ignition angle displacement. Two pathways for the torque actuation of the internal combustion engine can be utilized, whereby the slow pathway indicates an air volume flow regulation particularly by way of an electric throttle valve; and the rapid pathway indicates an ignition angle displacement, especially a retardation of the ignition angle. The torque actuation of a modern electric machine has a very much greater dynamic behavior in comparison to the slow pathway of the torque actuation of an internal combustion engine. The method according to the invention allows for a large dynamic behavior of the drive.

The invention can be deployed in all hybrid-electric drives, in which the torque of a combustion engine or several combustion engines and the torque of an electric machine or several electric machines yield a drive torque in a common manner.

The electromotive torque reserve can be ascertained with a great deal of accuracy on the basis of the momentary operating states of the one or several electric machines, of the one or several power storage batteries or of the one or several on-board electric networks. A large dynamic behavior with consistently small fuel consumption and small exhaust gas emissions can be assured if the absent internal combustion engine torque reserve is compensated for by the one or several electric machines.

As a matter of expedience, a nominal lead drive torque and a nominal drive torque are predetermined for the entire drive by an overriding control mechanism. The torque reserve for the entire drive torque of the drive is preferably equal to the difference between the nominal lead drive torque and the nominal drive torque, whereby the lead drive torque is larger than or equally large as the nominal drive torque.

It is advantageous for the operational safety of the motor vehicle if the nominal charging torque of the one or at least one of the several electric machines is set so that an energy supply of the one or several on-board electric networks and of the one or several power storage batteries is assured. In the case of a negative nominal charging torque, one of the electric machines is preferably operated by a generator in order to again charge up the power storage battery. Most favorably the nominal lead drive torque and the nominal drive torque for the entire drive are then increased in order to compensate for the load on the electric machines.

On the basis of the momentary operating states of the one or the several electric machines, of the one or the several power storage batteries and of the one or the several on-board electric networks, an instant maximum torque and an instant minimum torque of the one or the several electric machines can be ascertained. The electromotive torque reserve is preferably constructed as the difference between the instant maximum torque and the nominal charging torque.

A nominal lead torque for the internal combustion engine can be ascertained from the correction of the nominal lead drive torque for the entire drive by the nominal charging torque, whereby the nominal lead torque is produced by means of air volume flow adjustment.

A nominal internal combustion engine torque can be constructed from the correction of the nominal drive torque for the entire drive by the nominal charging torque, whereby the nominal internal combustion engine torque is adjusted by way of an ignition angle displacement.

An increased fuel consumption and increased exhaust gas emissions can be restricted to a few operating phases if the internal combustion engine torque reserve is only adjusted if the electromotive torque reserve becomes smaller than the required torque reserve for the entire drive torque.

The nominal lead torque for the internal combustion engine is preferably always selected greater than or at least equal to the nominal torque for the internal combustion engine. As a matter of expedience, this results by means of a maximum selection.

A differential torque between an actual torque of the internal combustion engine and the nominal torque can be impressed on the one or the several electric machines; and from the sum of the differential torque and the nominal charging torque, a nominal torque of the electric machines can be constructed. The torque reserve of the electric machines is advantageously utilized here. If in fact the torque reserve is utilized for the entire drive torque, i.e. the nominal drive torque is increased with a large dynamic behavior in the direction of the nominal lead drive torque, an increase with a large gradient in the nominal lead torque for the internal combustion engine can also arise due to the maximum selection. By way of dynamic filling efficiencies in the intake manifold, modeled as a dead time element and a lag element of the first order, the onset of the base torque of the internal combustion engine, which the engine would produce due to the predetermined nominal lead torque at the optimal ignition angle, is merely delayed in this case. The actual torque of the internal combustion engine is restricted to the base torque and thus deviates temporarily from the nominal torque for the internal combustion engine. The differential torque arising as a result is impressed on the one or several electric machines and together with the nominal charging torque yields the nominal torque for the electric machine.

A device for the implementation of the method to operate a motor vehicle drive is proposed with at least one internal combustion engine and at least one electric machine mechanically coupled to said internal combustion engine as well as with at least one power storage battery, which is actively connected to at least the one electric machine and to at least the one internal combustion engine in at least one on-board electric network, wherein said internal combustion engine and said electric machine produce a nominal required drive torque in a substantially common manner, and wherein an overriding control mechanism is constructed in order to specify a nominal lead torque for the entire drive and a nominal torque for the entire drive in such a way that an instant electromotive torque reserve of the one or several electric machines can be ascertained. This instant electromotive torque reserve is then taken into account in the specification of an internal combustion engine torque reserve for at least the one or several internal combustion engine(s) so that the internal combustion engine torque reserve equals a minimum reference torque reserve, and in sum total a specified torque reserve is present for the drive torque of the entire drive.

BRIEF DESCRIPTIONS OF THE DRAWINGS

Additional forms of embodiment, aspects and advantages of the invention also arise independently of their summarization in claims without the constraint of the generality of the examples of embodiment according to the invention depicted as follows using the diagrams.

The following are shown:

FIG. 1 a preferred schematic of the proposed method with an internal combustion engine and an electric machine; and FIG. 2 a-d time curves of torques with (a) a nominal lead torque and a nominal torque for the entire drive, (b) a base torque of an internal combustion engine and an actual torque, (c) an actual torque of an electric machine, (d) an actual torque of the entire power train.

DETAILED DESCRIPTION

In the method proposed according to the invention for the operation of a motor vehicle drive, which is depicted in FIG. 1, provision is made for at least one internal combustion engine 10 and at least one electric machine 20 mechanically coupled with said internal combustion engine 10. The internal combustion engine 10 is preferably a gasoline engine with an intake manifold fuel injection, with an electronic gas pedal with an electronic throttle valve, which is not schematically depicted, and with a catalytic converter, which is not schematically depicted. The flywheel of the internal combustion engine 10 is coupled with the electric machine 20, which is preferably designed as a crankshaft starter generator.

Furthermore, provision is made for at least one power storage battery, which is not schematically depicted, to be actively connected to said electric machine 20 and to said internal combustion engine 10 in at least one on-board electric network. The power storage battery is preferably an automotive battery and can, for example, be charged by the electric machine 20 if this is operated as a generator. The internal combustion engine 10 and the electric machine 20 produce a nominal required drive torque M in a substantially common manner, whereby the actual torques $M_{VM\ ist}$ of the internal combustion engine 10 and the actual torques $M_{E\ ist}$ of the electric machine 20 add up to the actual torque $M_{ist}$ of the entire drive, i.e. to the sum total torque of the internal combustion engine 10 and the electric machine 20.

An overriding control unit, which is not schematically depicted, specifies a nominal lead drive torque $M_L$ and a nominal drive torque M for the entire drive. In that $M_L$ is specified larger than M, a reserve is required for the entire drive torque $M_{ist}$ of the drive. This reserve corresponds to the difference $M_L - M$ of the two variables.

With a nominal charging torque $M_{Lade}$, provision is made for an intervention, which assures the energy supply to the on-board electric network and to the power storage battery. When a negative nominal charging torque $M_{Lade}$ occurs, the electric machine 20 is operated as a generator, and the nominal lead drive torque $M_L$ and the nominal drive torque M are increased for the entire drive in order to compensate for the load on the electric machine 20.

An instant maximum torque $M_{E\ max}$ and an instant minimum torque $M_{E\ min}$ of the electric machine 20 are ascertained from the momentary operating states of the electric machine 20, of the one or several power storage batteries and of the one or several on-board electric network(s). The difference between the maximum torque $M_{E\ max}$ of the electric machine 20 and the nominal charging torque $M_{Lade}$ corresponds to an electromotive torque reserve $M_{E\ res}$ of the electric machine 20.

Modern gasoline engines with an intake manifold fuel injection have for the most part an electronic throttle valve for the regulation of the air volume flow. The accelerator pedal is mechanically uncoupled from the electronic throttle valve. The limited adjustment speed of the throttle valve actuator and the dynamic filling efficiencies in the intake manifold do not permit a highly dynamic adjustment of a specified air volume flow and of the internal combustion engine torque, which is thereby produced. An ignition angle intervention ZWE and a reduction of the internal combustion engine torque, which goes along with it, can on the other hand take place practically without any delay. As a result, two pathways are present for the torque actuation, for which an associated nominal torque $M_{VM L}$ and $M_{VM}$ can be specified in each case.

The nominal lead torque $M_{VM L}$ for the internal combustion engine 10 impacts its entire air pathway, and the air volume flow in the intake manifold is accordingly adjusted. When the ignition angle is optimal, the internal combustion engine 10 would produce a torque denoted as the base torque $M_{VM Bas}$. In the steady state region, the base torque $M_{VM Bas}$ corresponds to the nominal lead torque $M_{VM L}$ of the internal combustion engine 10.

In the non-steady state region, dynamic filling efficiencies have an effect in the intake manifold, in that combustion air is drawn in for the internal combustion engine. The translation of the nominal lead torque $M_{VM L}$ into the base torque $M_{VM Bas}$ can approximately be described by means of a series connection of a dead time element 11 and a lag element of the first order 12 (PT1).

Beside the nominal lead torque $M_{VM L}$, which has an effect on the air pathway by way of a throttle valve displacement, a nominal torque $M_{VM}$ impacts the rapid ignition angle pathway for the internal combustion engine 10. By retarding the ignition angle with regard to the optimal ignition angle, the efficiency of the internal combustion engine 10 is decreased compared to the base torque $M_{VM Bas}$.

The model in FIG. 1 depicts the conditions in the internal combustion engine 10 in simplified form. The nominal torque $M_{VM}$ for the internal combustion engine 10 is restricted to a region between the base torque $M_{VM Bas}$ and a minimum base torque $M_{VM Bas\ min}$ and yields the actual torque $M_{VM ist}$ of the internal combustion engine 10. The time delay during the ignition angle intervention is small and can be neglected. The base torque $M_{VM Bas}$ thereby corresponds to the actual torque $M_{VM ist}$ of the internal combustion engine 10, which arises when the ignition angle is optimal. The minimum base torque $M_{VM Bas\ min}$ is smaller than the base torque $M_{VM Bas}$ and corresponds to the actual torque $M_{VM ist}$ in the case of a maximum ignition angle retardation.

In some operating states, the nominal lead torque $M_{VM L}$ is selected larger than the nominal torque $M_{VM}$ by the overriding control unit, whereby the difference then corresponds to a torque reserve. An ignition angle displacement occurs then in the retarding direction. The actual torque $M_{VM ist}$ of the internal combustion engine 10 can then be increased practically free of delay by increasing the nominal torque $M_{VM}$ in connection with a degradation of the ignition angle retardation. This action is implemented, for example, to make a rapid torque build-up at idling possible, and in so doing it allows for a quick reaction to load changes. It is also implemented, for example, in connection with shifting operations in automatic transmissions.

The instant actual torque $M_{VM ist}$ of the internal combustion engine 10 can be ascertained in modern internal combustion engines 10 on the basis of variables measured or estimated by their engine management systems. In a gasoline engine with intake manifold fuel injection, these variables include, for example, engine rotational speed, intake manifold pressure, ignition timing and air number $\lambda$. The torque actuation in a diesel engine, particularly in one with turbocharging, can also in principle be divided into a slow pathway with a nominal lead torque $M_{VM L}$ and a rapid pathway with a nominal torque $M_{VM}$.

The torque actuation in a modern electric machine 20 has in contrast a very much larger dynamic behavior in comparison to the slow pathway of the torque actuation of the internal combustion engine 10.

As can be seen in FIG. 1, the nominal torque $M_{VM}$ for the rapid ignition angle pathway of the internal combustion engine 10 is the result of the nominal drive torque M for the entire drive being corrected by the nominal charging torque $M_{Lade}$.

The nominal lead torque $M_{VM L}$ for the internal combustion engine 10 is ascertained from the nominal lead drive torque $M_L$ for the entire drive corrected by the nominal charging torque $M_{Lade}$. The torque reserve $M_{E\ res}$ of the electric machine 20 is deducted in order to minimize the torque reserve of the internal combustion engine 10. A torque reserve in the internal combustion engine 10 in conjunction with an ignition angle retardation, which is not beneficial to reducing consumption and emissions, is therefore only then set up if the torque reserve $M_{E\ res}$ of the electric machine 20 is no longer sufficient to set up the required reserve for the entire drive torque $M_{ist}$ of the drive.

A maximum selection sees to it that the nominal lead torque $M_{VM L}$ for the internal combustion engine 10 does not drop beneath the nominal torque $M_{VM}$ for the rapid ignition pathway of the internal combustion engine 10.

If the reserve is used for the entire drive torque $M_{ist}$, i.e. the nominal drive torque M is increased with a large dynamic behavior in the direction of the nominal lead torque $M_L$, an increase with a large gradient can also arise in the nominal lead torque $M_{VM L}$ for the internal combustion engine 10 due to the maximum selection. By way of dynamic filling efficiencies in the intake manifold, modeled as a dead time element 11 and a lag element of the first order 12 (PT1), the onset of the base torque $M_{VM Bas}$ is merely delayed in this case. The actual torque $M_{VM ist}$ of the internal combustion engine 10 is restricted to the base torque $M_{VM Bas}$ and, therefore, temporarily deviates from the nominal torque $M_{VM}$ for the internal combustion engine 10. A differential torque $M_{VM delta}$ arising in the process is impressed on the electric machine 20 and yields together with the nominal charging torque $M_{Lade}$ a nominal torque $M_E$ of the electric machine 20, whereby the torque reserve $M_{E\ res}$ of the electric machine 20 is utilized.

The electric machine 20 transfers a nominal torque $M_E$ using a large dynamic behavior so that the torque actuation by the electric machine 20 is essentially accepted without delay. The actual drive torque $M_{ist}$ of the entire drive, which results from the actual torques $M_{VM}$ ist and $M_{E\ ist}$ of the internal combustion engine 10 and the electric machine 20, therefore follows the nominal drive torque M without delay.

Figure 2A:
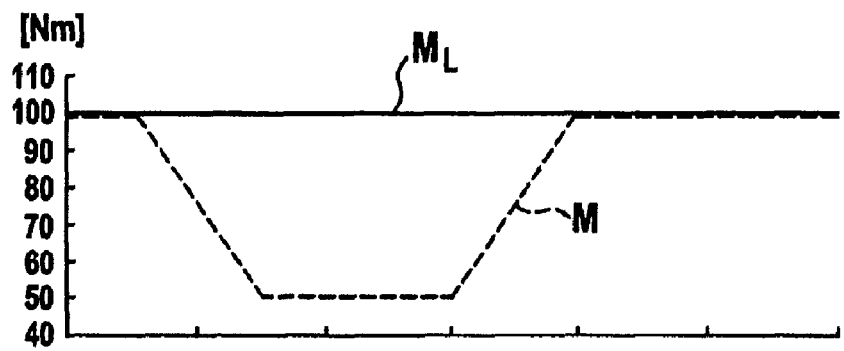
Figure 2B:
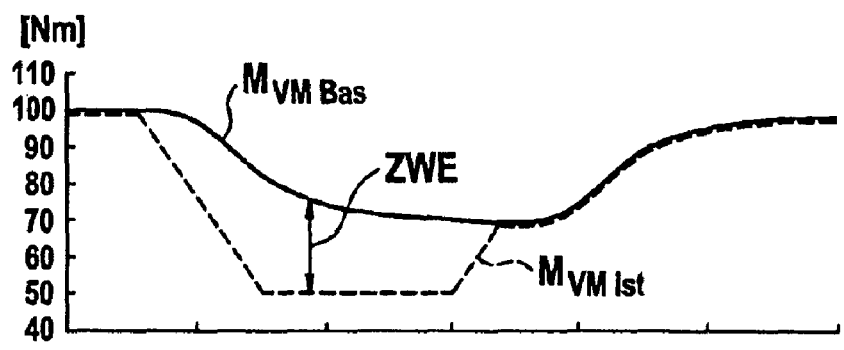
Figure 2C:
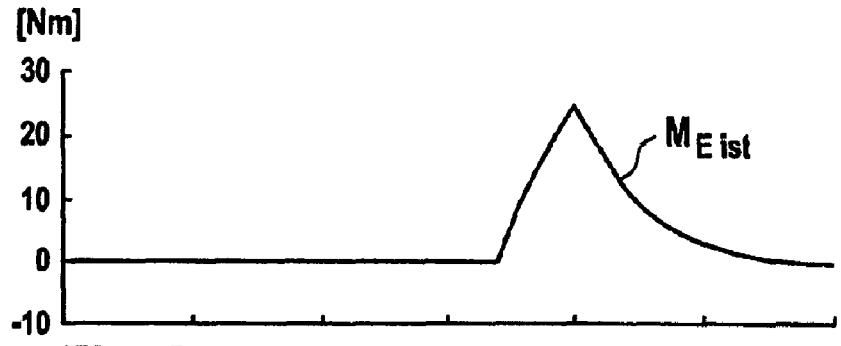
Figure 2D:
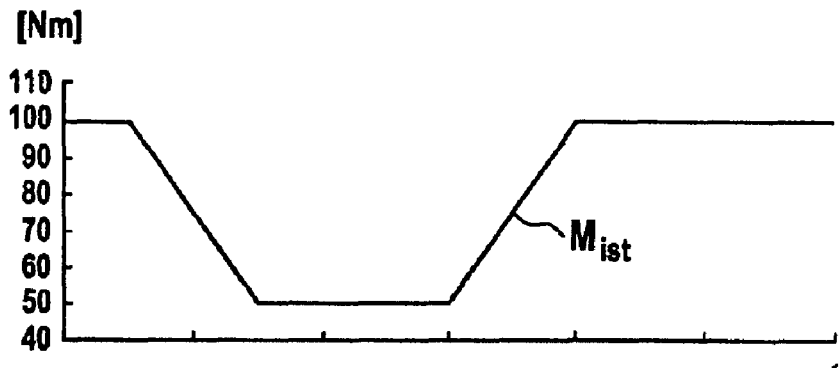

In FIG. 2 a-d time curves of the torques are depicted from the schematic of FIG. 1, whereby FIG. 2a depicts the curve of a nominal lead torque $M_L$ and that of a nominal torque M for the entire drive, whereby FIG. 2b depicts the curve of a base torque $M_{VM Bas}$ of an internal combustion engine 10 and that of an actual torque, whereby FIG. 2c depicts the curve of an actual torque $M_{E\ ist}$ of an electric machine 20 and whereby FIG. 2d depicts the curve of an actual torque $M_{ist}$ of the entire drive. In each case an ideal curve of a temporary retraction of the nominal drive torque M is depicted—as it, for example, can occur when shifting into another gear of the transmission. The nominal drive torque M is thereby temporarily reduced from, for example, 100 Nm down to 50 Nm while the nominal lead drive torque $M_L$ remains constant at, for example, 100 Nm. The torque values are to be understood simply as examples.

The intervention by way of the nominal charging torque $M_{Lade}$ is not considered in the following to be a simplified depiction. The formula $M_{Lade}=0$ is valid. The maximum torque $M_{E\ max}$ of the electric machine 20 is, for example, 30 Nm and is assumed to be constant for the time interval being considered. For this reason, 20 $M_{E\ res}=30$ Nm is valid for the torque reserve $M_{E\ res}$ of the electric machine 20.

With the reduction of the nominal drive torque M, the onset of the drop in the base torque $M_{VM\ Bas}$ of the internal combustion engine 10 is also delayed—as is shown in FIG. 2*b*. The drop is restricted to the nominal lead drive torque $M_L=100$ Nm less the torque reserve $M_{E\ res}$ of the electric machine 20, where $M_{E\ res}=30$ Nm. During the reduction of the nominal drive torque M, the base torque $M_{VM\ Bas}$ asymptotically approaches a value of 70 Nm. Because $M_{Lade}=0$, the nominal torque $M_{VM}$ for the rapid ignition angle pathway of the internal combustion engine 10 corresponds to the nominal drive torque M. As long as the nominal drive torque M lies below the base torque $M_{VM\ Bas}$, an ignition angle intervention ZWE results in the strength denoted in FIG. 2*b*; and the formula $M_{VM\ ist}=M$ is valid.

If the nominal drive torque M is increased above 70 Nm, whereby the value corresponds to the difference between the nominal lead torque $M_L$ and the torque reserve $M_{E\ res}$ of the electric machine 20, the base torque $M_{VM\ Bas}$ thus ensues due to the maximum selection. The delay of the base torque $M_{VM\ Bas}$ resulting thereby leads to a delayed build-up in the actual torque $M_{VM\ ist}$ in the internal combustion engine 10 in comparison with the nominal torque $M_{VM}$ for the internal combustion engine 10, which corresponds to the nominal drive torque M. The differential torque $M_{VM\ delta}$ is impressed on the electric machine 20. The electric machine 20 thereby compensates for the delayed torque build-up in the internal combustion engine 10.

During the process, the actual drive torque $M_{ist}$ of the entire drive, i.e. the cumulative torque of the internal combustion engine 10 and the electric machine 20, corresponds to the nominal drive torque M. The required reserve for the entire actual drive torque $M_{ist}$ is kept ready and utilized; the base torque $M_{VM\ Bas}$ is reduced, which minimizes the effect of a retardation of the ignition angle.

The invention claimed is:

1. A method of operating a vehicle drive with at least one internal combustion engine and at least one electric machine mechanically coupled to said internal combustion engine and having at least one power storage battery operatively connected to the at least one electric machine and to the at least one internal combustion engine in at least one on-board electric network, wherein said internal combustion engine and electric machine jointly produce a nominal required drive torque, the method comprising:
   ascertaining an instant electromotive torque reserve of the at least one electric machine; and
   specifying an internal combustion engine torque reserve for the at least one internal combustion engine taking into account the instant electromotive torque reserve, so that the internal combustion engine torque reserve equals a minimum reference torque reserve of the internal combustion engine for the at least one internal combustion engine;
   wherein the internal combustion engine torque reserve corresponds to a difference between a nominal lead drive torque of the internal combustion engine and a nominal drive torque of the internal combustion engine; and
   wherein the nominal lead drive torque of the internal combustion engine is selected to be greater than the nominal drive torque of the internal combustion engine in at least some operating states of the vehicle drive.

2. A method according to claim 1, wherein ascertaining includes ascertaining the instant electromotive torque reserve on the basis of momentary operating states of the at least one electric machine, of the one power storage battery, and of the at least one on-board electric network.

3. A method according to claim 1, further comprising specifying a nominal lead drive torque and a nominal drive torque for the entire drive by an overriding control mechanism.

4. A method according to claim 3, wherein the torque reserve for the entire drive torque of the drive is equal to the difference between the nominal lead drive torque and the nominal drive torque, wherein the nominal lead drive torque is greater than the nominal drive torque or equal to the nominal drive torque.

5. A method according to claim 1, further comprising setting a nominal charging torque of the at least one electric machine in such a way that an electric supply of the at least one on-board electric network and of the at least one power storage battery is assured.

6. A method according to claim 5, wherein when a negative nominal charging torque occurs, the at least one of the electric machine is driven as a generator.

7. A method according to claim 6, further comprising increasing the nominal lead drive torque and a nominal drive torque for the entire vehicle drive in order to compensate for a load on the electric machines.

8. A method according to claim 1, further comprising ascertaining on the basis of the momentary operating states of the at least one electric machine, of the at least one power storage battery, and of the at least one on-board electric network, an instant maximum torque reserve and an instant minimum torque of the at least one electric machine.

9. A method according to claim 8, wherein the instant electromotive torque reserve is constructed as a difference between the instant maximum torque reserve and a nominal charging torque.

10. A method according to claim 9, comprising ascertaining a nominal lead torque for the internal combustion engine from the nominal lead drive torque corrected by the nominal charging torque, wherein the nominal lead torque is produced by a setting of an air volume flow.

11. A method according to claim 10, wherein the nominal lead torque for the internal combustion engine is always selected to be greater than or at least equal to the nominal lead drive torque for the internal combustion engine.

12. A method according to claim 1, wherein the internal combustion engine torque reserve is only adjusted if the instant electromotive torque reserve becomes smaller than a required torque reserve for the entire vehicle drive.

13. A method according to claim 1, comprising constructing a nominal internal combustion engine torque from the nominal drive torque for the entire vehicle drive corrected by the nominal charging torque, and further comprising adjusting the nominal internal combustion engine torque by means of an ignition angle displacement.

14. A method according to claim 1, further comprising impressing a differential torque between an actual torque of the internal combustion engine and a nominal torque on the at least one of the electric machine(s); and constructing from a cumulative sum of the differential torque and a nominal charging torque, a nominal torque of the electric machine(s).

15. A system for implementation of a method for operating a vehicle drive, the system comprising: at least one internal combustion engine and at least one electric machine mechanically coupled to said internal combustion engine as well as with at least one power storage battery operatively connected to said electric machine and to said internal combustion engine in at least one on-board electric network, wherein said internal combustion engine and electric machine jointly produce a required nominal drive torque and wherein an overriding control mechanism is disposed in order to specify a nominal lead torque for the entire vehicle drive and a nominal torque for the entire vehicle drive in such a way that an instant electromotive torque reserve of the at least one electric machine can be ascertained, and this is taken into account during specification of an internal combustion engine torque reserve for the at least one internal combustion engine so that said torque reserve equals a minimum reference torque reserve of the internal combustion engine for the at least one internal combustion engine;

wherein the internal combustion engine torque reserve corresponds to a difference between a nominal lead drive torque of the internal combustion engine and a nominal drive torque of the internal combustion engine; and wherein the nominal lead drive torque of the internal combustion engine is selected by the overriding control mechanism to be greater than the nominal drive torque of the internal combustion engine in at least some operating states of the vehicle drive.

* * * * *